United States Patent [19]

Salliotte

[11] Patent Number: 5,648,707
[45] Date of Patent: Jul. 15, 1997

[54] INTERMITTENT WINDSHIELD WIPER SYSTEM

[75] Inventor: James E. Salliotte, Woodhaven, Mich.

[73] Assignee: United Technologies Automotive, Inc., Dearborn, Mich.

[21] Appl. No.: 505,687

[22] Filed: Jul. 21, 1995

[51] Int. Cl.⁶ ................................................. H02P 1/04
[52] U.S. Cl. ..................... 318/443; 318/444; 318/483; 307/9.1; 15/250.17
[58] Field of Search .................................. 318/443, 444, 318/483, DIG. 2; 150/250.17; 307/9.1, 10.1

[56] References Cited

U.S. PATENT DOCUMENTS

| | | | |
|---|---|---|---|
| 4,091,317 | 5/1978 | Roszyk et al. | 318/DIG. 2 X |
| 4,393,341 | 7/1983 | Byrne | 318/443 |
| 4,492,904 | 1/1985 | Graham | 318/444 |
| 5,166,587 | 11/1992 | Smart | 318/444 |
| 5,254,916 | 10/1993 | Hopkins | 318/443 |
| 5,444,307 | 8/1995 | Sheets et al. | 307/10.1 X |

FOREIGN PATENT DOCUMENTS

| | | |
|---|---|---|
| 4136724A1 | 5/1993 | Germany . |
| 2072879 | 3/1980 | United Kingdom . |

OTHER PUBLICATIONS

Prozessorgesteuerter Wischer–Intervall–Schalter PWS 1 ELV Journal No. 60, Nov.–Dec. 1988.

Primary Examiner—Karen Masih
Attorney, Agent, or Firm—Howard & Howard

[57] ABSTRACT

An intermittent windshield wiper system includes a wiper control module and a wiper switch which allows an operator to set a time delay between consecutive wipes of a windshield wiper. The wiper switch includes an input setting that allows an operator to set the time delay according to the operator's needs and weather conditions. The wiper control module records the time delay and controls a wiper motor to repeatedly actuate a windshield wiper with the operator-set time delay between consecutive actuations of the windshield wiper. In one embodiment, the control module includes a timer for measuring the time delay, a memory for recording the time delay and a motor control for controlling the wiper motor. A method of controlling a windshield wiper for a vehicle is also disclosed.

8 Claims, 1 Drawing Sheet

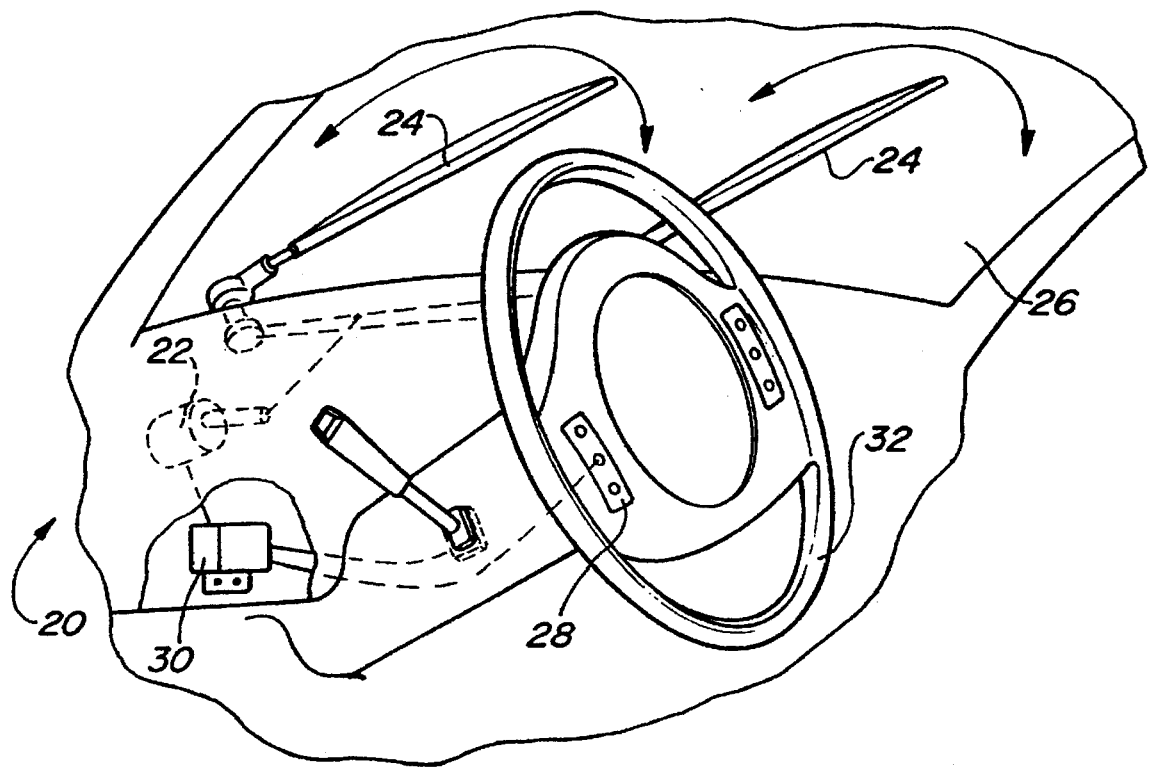
*Fig - 1*
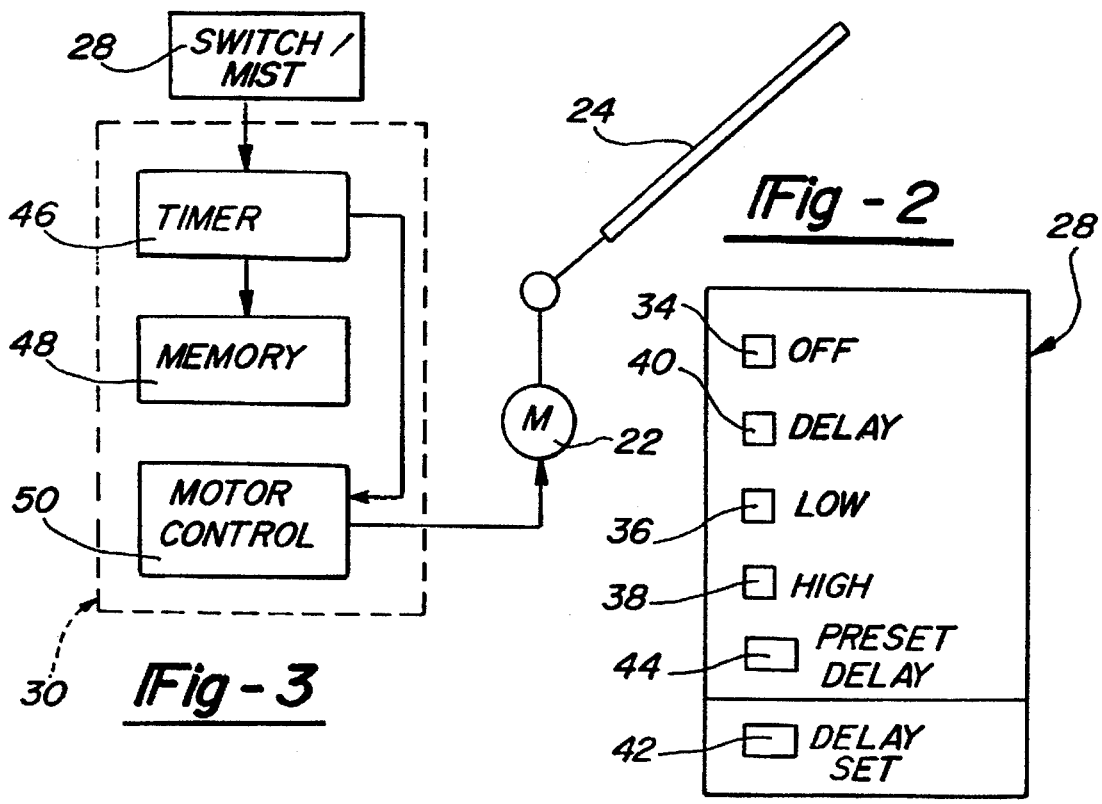

INTERMITTENT WINDSHIELD WIPER SYSTEM

BACKGROUND OF THE INVENTION

The present invention relates to an intermittent windshield wiper system including a wiper control module and a wiper switch which allows an operator to set a time delay between consecutive wipes of a windshield wiper.

Intermittent windshield wiper systems are well-known in the automotive industry. In addition to typical "low" and "high" settings of a standard wiper system, an intermittent wiper system provides preset wiper actuation cycles including preset time delays between consecutive wipes of a windshield wiper. Most intermittent wiper systems provide several settings, each having a different time delay between consecutive wipes.

Intermittent wiper systems provide periodic rather than constant wiping. They are less distracting to the operator than constant wipe actuation. On the other hand, it is important to ensure that they operate frequently enough to keep the windshield clean.

One problem with these intermittent wiper systems is that they require a "trial and error" adjustment between the various preset actuation cycles and time delays. As rain accumulates on a vehicle's windshield, an operator must determine which delay setting is appropriate for a given weather condition. However, the operator knows little about the individual wiper cycles other than the relative length of delay between the various pre-set settings. Thus, the operator usually has to adjust the intermittent wiper system several times before the appropriate windshield wiper actuation and time delay is established for a given weather condition. There are also "continuously" adjustable delay settings, but they also require trial and error.

Additionally, when weather conditions change, the "trial and error" procedure of establishing a wiper setting with an appropriate time delay must be re-executed to establish the appropriate setting for the new weather condition.

The intermittent wiper system of the present invention provides a system that allows an operator to select a desired time delay and windshield wiper actuation for an intermittent wiper system. The system eliminates the "trial and error" process of establishing an appropriate delay cycle based on current weather conditions.

SUMMARY OF THE INVENTION

The intermittent windshield wiper system of the present invention includes a wiper control module and a wiper switch. The wiper control module controls a wiper motor which actuates one or more windshield wipers. The wiper switch includes an input setting which allows an operator to set a time delay between actuations of the wiper by the windshield wiper motor. The control module records the time delay set by an operator and controls the windshield wiper motor to repeatedly actuate the wipers with a time interval between successive actuations defined by the set time delay.

Preferably, the operator inputs a delay initiation signal, and the wiper is actuated. At the point when the operator believes the windshield should again be wiped the delay button is actuated again. The wiper again wipes the windshield. The time between the two wipes is stored and the wiper is actuated based upon that stored delay.

In one embodiment, the switch of the windshield wiper system also includes an "off" setting, a plurality of continuous, variable wiper speed settings and one or more preset time delay settings. The preset delay settings allow an operator to choose from one or more preset time delays between actuations of a wiper by a wiper motor. The time delays defined by these preset delay settings cannot be altered.

The inventive method of controlling a windshield wiper for a vehicle, comprises setting a windshield wiper switch to a delay position, then using an operator input to set a time delay between consecutive actuations of a windshield wiper by a wiper motor. The time delay is then recorded in a wiper control module and the wiper motor is controlled to actuate the wiper repeatedly with the operator-set time interval between actuations of the wipers.

These and other features of the present invention will be best understood from the following specification and drawings, of which the following is a brief description.

BRIEF DESCRIPTION OF THE DRAWINGS

FIG. 1 is a perspective view of a wiper system according to the present invention as seen from the interior of a vehicle.

FIG. 2 is a view of a switch of a wiper system according to the present invention.

FIG. 3 is a schematic drawing of a wiper system according to the present invention.

DETAILED DESCRIPTION OF A PREFERRED EMBODIMENT OF THE INVENTION

Referring to FIG. 1, the invention relates generally to an intermittent windshield wiper system 20. A switch controls the movement of windshield wiper motor 22 which actuates windshield wipers 24. Wipers 24 sweep over windshield 26 to remove moisture and debris from windshield 26. Typical switches in these windshield wiper systems have an "off," "low," and "high" position which control the movement of wiper motor 22 and wipers 24. Wiper motor 22 and wiper 24 are of the type well known in the art and form no part of the present invention.

More recently, intermittent wiper systems have been introduced into many vehicles. The switches controlling these intermittent wiper systems include additional positions for controlling the movement of wiper motors 22 and wipers 24. Preset delay positions are selected on a switch. Motor 22 actuates wiper 24 to sweep repeatedly across windshield 26 with the preset time delay between consecutive sweeps. Most systems include a plurality of settings, each having a different delay time period between consecutive sweeping cycles. The above is also well known in the art and forms no part of the present invention.

The windshield wiper system 20 of the present invention includes a switch 28 and wiper control module 30 which controls the movement of wiper motor 22 to actuate wipers 24. Switch 28 is electrically connected to module 30 which is connected to one or more wiper motors 22 and wipers 24. Switch 28 is typically adjacent a steering wheel 32 of a vehicle for ease of operation.

As shown in FIG. 2, switch 28 includes several settings, including the typical "off," "low," and "high" settings 34, 36 and 38, respectively. In the low and high settings, 36 and 38, wiper motor 24 is controlled by module 30 to actuate wipers 24 in a continuous manner, at relatively slow and fast speeds, respectively.

Switch 28 also includes a "delay" setting 40. Setting 40 allows an operator to set a desired time delay between consecutive actuations of wipers 24 by wiper motor 22. A time delay is defined as a time period between consecutive wiping movements of wipers 24 actuated by wiper motor 22. To use delay setting 40, an operator depresses a delay set button 42 to start the delay time period. Setting the delay set button 42 causes motor 22 to actuate wipers 24 through at least one oscillation cycle, thereby cleaning windshield 26 of moisture and debris. When an operator perceives that sufficient moisture has accumulated on windshield 26, the operator depresses button 42 a second time. Control module 30 records the time period between successive depressions of button 42, and then controls wiper motor 22 to actuate wipers 24 repeatedly with the operator-set time delay between sweeping cycles of the wipers 24. Delay set button 42 may actuate a mist function when wiper switch 28 is in the off setting 34.

Switch 28 may also include one or more preset delay settings 44. These preset delay settings 44 allow an operator to select from a fixed, pre-programmed time delay. Unlike delay setting 40, preset delay settings 44 cannot be altered to accommodate changing weather conditions or the needs of an operator. These preset delay settings are well known in the art and form no part of the present invention.

As shown in FIG. 3, wiper control module 30 is electrically connected to switch 28 and wiper motor 22. Wiper control module 30 may be made from known components capable of recording the time delay set by an operator and controlling wiper motor 22 to actuate wipers 24 according to the set time delay. In one embodiment, control module 30 includes a timer 46, memory 48 and a motor control 50. Timer 46 measures the time period set by an operator, as described above. The time delay period is then recorded in memory 48. With the time delay period recorded in memory 48, timer 46 signals motor control 50 according to the operator-set time delay. Motor control 50 then controls wiper motor 22 to actuate wiper 24 repeatedly with time delays between consecutive actuations of wiper 24. Timer 46, memory 48 and motor control 50 may be standard components which are known in the art. Other circuits may be utilized for module 30. Moreover, the functions may be combined into a single component.

In a method according to the present invention, a windshield wiper for a vehicle is controlled according to a time delay set by an operator of the vehicle. A windshield wiper switch 28 is set to a delay setting 40 when, for example, moisture accumulate on windshield 26 of a vehicle. Preferably, control module 30 controls wiper motor 22 to actuate wipers 24 through at least one oscillation cycle when wiper switch 28 is set to delay position 40. Alternatively, the operator initiates the time delay period by depressing delay set button 42 which actuates wipers 24 through a cycle. When the operator feels sufficient moisture has accumulated on windshield 26 and requires wiping, the operator establishes a time delay period by depressing delay set button 42. Wiper control module 30 records the time delay between consecutive depressions of set button 42. Control module 30 then controls wiper motor 22 to actuate wiper 24 repeatedly according to the time delay set by the operator. During each time delay period, wiper motor 22 and wiper 24 remain at rest. Control module 30 controls wiper motor 22 to continually actuate wipers 24 until switch 28 is set to the off setting 34 or until the time delay is reset. With this invention the delay is identically and easily tailored to the existing weather conditions.

If weather conditions subsequently change, the operator may set a new time delay by resetting the control module 30 by, for example, depressing delay set button 42 twice. After sufficient moisture accumulates on windshield 26, the operator depresses delay set button 42 once more, thereby resetting the time delay and control module 30 records the new time delay and controls motor 22 according to the new time delay.

A preferred description of this invention has been disclosed; however, a worker of ordinary skill in the art would recognize that certain modifications would come within the scope of this invention. For that reason, the following claims should be studied to determine the true scope and content of this invention.

I claim:

1. An intermittent windshield wiper system comprising:
   at least one windshield wiper motor and wiper;
   a wiper control module for controlling said wiper motor;
   a wiper switch including an input setting for allowing an operator to set a time delay between actuations of said wiper by said windshield wiper motor, said input setting being first actuated to start a period of time and said input setting being then actuated a second time to end said period of time, said time delay being defined by said period of time between said first and second actuations, said control module including means for recording said time delay and controlling said wiper motor to repeatedly actuate said wiper with a time interval between said actuations set by said operator-set time delay; and
   said input setting including a delay set button actuated for both said first and said second actuations, said button also activating another wiper function when not setting said time period, said wiper switch further comprising an off setting, a plurality of continuous, variable wiper speed settings, and one or more preset delay settings for allowing said operator to choose from one or more preset time delays of said wiper by said motor.

2. A windshield wiper system as recited in claim 1, wherein said input button controls a mist function when said off setting is activated.

3. A windshield wiper system as recited in claim 1, wherein said control module comprises a motor control for controlling said wiper motor, a timer for measuring said time delay and a memory for recording said time delay.

4. A windshield wiper system as recited in claim 1, wherein said wiper control module actuates said wiper upon receiving a signal that an operator wishes to set a time delay, and said wiper control module then records said time delay until an operator sets a signal that another wipe is desired, said recorded time delay being stored and used to control said wipers.

5. A method of controlling a windshield wiper for a vehicle, said method comprising the steps of:
   first actuating an operator input to begin a time period, then second actuating an operator input to define a time period between said first and second actuations, setting a time delay by said time period, said time delay controlling the time between consecutive actuations of a windshield wiper;
   recording said time delay in a wiper control module;
   controlling a wiper motor to actuate said wiper repeatedly with a time interval between said actuations set by said operator-set time delay; and said operator input being actuated by the operator depressing a delay set button, allowing moisture to accumulate on a windshield of the vehicle, and then depressing said delay set button again, wherein said delay set button is also used to actuate a mist function, said switch including an off setting and said delay set button actuating said mist function when said switch is at said off setting and said delay set button setting said time period when said switch is not at said off setting.

6. A method as recited in claim 5, wherein said switch initially actuates said wiper through at least one cycle when said operator input is initiated.

7. A method as recited in claim 6, wherein said method includes said operator depressing a delay set button to set the time delay between consecutive wipes of said wiper.

8. A method as recited in claim 5, wherein said control module includes a timer, a memory and a motor control, wherein said timer measures said time delay, said memory records said time delay and said motor control controls said wiper motor.

* * * * *